United States Patent [19]

Chabanet et al.

[11] Patent Number: 5,426,773
[45] Date of Patent: Jun. 20, 1995

[54] COMMUNICATION CONTROLLER ALLOWING CONTINUED COMMUNICATION THROUGH AN X25 NETWORK AND AN SNA NETWORK IN THE EVENT OF AN SNA SESSION FAILURE

[75] Inventors: Anne Chabanet, Le Bar Sur Loup; Jean-jacques Chartreux, Mouans-Sartoux; Eric Lebrun, Saint Jeannet; Guy Platel, La Gaude; Alain Rey, Saint-Raphael, all of France

[73] Assignee: International Business Machines Corporation, Armonk, N.Y.

[21] Appl. No.: 902,640

[22] Filed: Jun. 23, 1992

[30] Foreign Application Priority Data

Jun. 28, 1991 [EP] European Pat. Off. ........... 91480096

[51] Int. Cl.⁶ .............................................. G06F 11/00
[52] U.S. Cl. ...................................... 395/575; 371/8.2
[58] Field of Search ................... 371/8.1, 8.2, 19, 11.1, 371/20.1; 364/228; 395/575

[56] References Cited

U.S. PATENT DOCUMENTS

| | | | |
|---|---|---|---|
| 4,975,914 | 12/1990 | Ashton et al. | 371/11.2 |
| 5,021,949 | 6/1991 | Morten et al. | 364/200 |
| 5,023,780 | 6/1991 | Bearley . | |
| 5,023,873 | 6/1991 | Stevenson et al. | 371/8.2 |
| 5,027,269 | 6/1991 | Grant et al. | 371/9.1 |
| 5,077,730 | 12/1991 | Arrowood et al. | 371/11.2 |
| 5,155,678 | 10/1992 | Fukumoto et al. | 395/425 |
| 5,235,595 | 8/1993 | O'Dowd | 370/94.1 |
| 5,303,238 | 4/1994 | Brodd et al. | 370/94.1 |

FOREIGN PATENT DOCUMENTS 0395563 10/1990 European Pat. Off. .

OTHER PUBLICATIONS

Passmore "Prospects for Future Integrated Communications Processors" Interface 88 Papers Proceedings 1988 pp. 39-50.

Chen et al "Analysis and Design of a Highly Reliable Transport Architecture for ISDN Frame-Relay Networks" IEEE Journal on Selected Areas in Comm. vol. 7 No. 8 Oct. 1989.

Abdelmonem, "Availability and Performance of Self-healing Telecommunications Networks and Their Impact on IBM SNA Session Performance, Abailability and Reliability" Proreed. 2nd IEEE workshop on Future Trends of Distribbuted Company Systems 1990 pp. 245-253.

Telesis. vol. 15, No. 2, 1988, Ottawa Calif., pp. 45-54, J. Brearley et al, "DPN SNA Multihost: The Marriage of IBM SNA and X.25 Networks".

IBM Systems Journal, vol. 26, No. 1, 1987, Armonk, N.Y., pp. 13-35, R. J. Sundstrom, "Part II, SNA: Current Requirements and Direction".

*Primary Examiner*—Robert W. Beausoliel, Jr.
*Assistant Examiner*—Joseph E. Palys
*Attorney, Agent, or Firm*—John J. Timar

[57] ABSTRACT

Communication controller allowing communication between application programs running in at least one host computer and DTEs attached to a X25 packet switched network and communicating through virtual circuits (VC), the communication being provided through the X25 network and a Systems Network Architecture (SNA) network. The controller includes tables and logic for establishing predetermined SNA sessions between the application programs and the communication controller, and tables and logic for linking at least one virtual circuit on a predetermined SNA session. The controller further includes memory for storing a set of alternate session tables defining, for each of said established predetermined SNA sessions, a prioritized list of alternate backup sessions, logic for detecting the occurrence of one failure on one SNA session, and logic for switching the virtual circuits linked to said session being subject of a failure to one backup session defined in the corresponding alternate session table. The alternate sessions being pre-established, the virtual circuits can be immediately connected to one alternate session without requiring further delay. A quick end-user reconnection is then allowed.

7 Claims, 5 Drawing Sheets

COMMUNICATION CONTROLLER ALLOWING CONTINUED COMMUNICATION THROUGH AN X25 NETWORK AND AN SNA NETWORK IN THE EVENT OF AN SNA SESSION FAILURE

TECHNICAL FIELD OF THE INVENTION

The invention relates to the data communication field and more particularly to a communication controller for allowing the communication between application programs running into at least one host computer or server and numerous Data Terminating equipments (DTEs) attached to a X25 packet switched network, the communication being provided through virtual circuits connected to a Systems Network Architecture (SNA) network.

BACKGROUND ART

The availability of telecommunication networks—i.e., the possibility for a user to transmit and receive data through a telecommunication network at any instant despite failure at one element of the network—is of great interest in the telecommunication field. The telecommunication users are particularly sensitive to the response time involved in their communication through the network and generally speaking, a response time of about one minute is considered as being a maximum acceptable delay for high priority interactive services. Such a requirement implies that the telecommunication network be capable of managing the different failures and outages which are likely to occur in the telecommunication network and which are likely to interrupt the telecommunication.

FIG. 1 shows an example of a System Network Architecture (SNA) network allowing the communication between host computers or servers 100 and 101 and remote Data Terminating Equipment (DTE) 110 via a X25 telecommunication network 109. Host computer 100, which can be, for example, an IBM 3090 computer, is connected to a local front-end communication controller such as an IBM 3745 via a telecommunication channel 102. Similarly, host computer 101 is attached to a second local front-end communication controller 106 via a second telecommunication channel 104 and can also, for instance, be attached to communication controller 105 via a third channel 103. Host computers 100 and 101 are loaded with their respective application programs such as credit card or airlines telecommunication applications. Communication controllers 105 and 106, being in the same location in the considered example, are loaded with Network Control Programs (NCP) well known in the telecommunication field. Front-end controllers 105 and 106 are connected via a SNA network 112 to a set of two remote telecommunication controllers 107 and 108. Telecommunication controllers 107 and 108 are loaded with Network Control Program (NCP) and also a telecommunication software—hereafter referred to NCP Packet Switching Interface or NPSI—for allowing the access to a X25 type network 109, thereby allowing the DTEs 110 to communicate with host computers 100 and 101. It should be noticed that the number of host computers which can be attached to the telecommunication network is not limited to two. Assuming that failure of an element of the telecommunication network occurs, such as a host, a channel, a link or any intermediate node communication controller, except however those providing access to the X25 network -the end-user will be compelled to wait until the considered element is repaired; this might take a long time before the user is allowed to communicate again through the network.

Moreover, in some applications such as those applications cited above, it is quite frequent that the hosts 100 and 101 share an unique data base which can be updated by either of them. Airlines reservations applications are frequently running in different host computers which can access the same data base by means of an appropriate software such as the IBM Transaction Processing Facility. In such cases, it can appear that the Communication and Transmission Control Program running in one host, e.g., host 100, becomes no longer capable of managing new incoming calls because of some buffer storage or Central Processing Unit (CPU) overload. Such an event results in that a user requesting the processing of one supplementary transaction with the considered host 100 will be prevented from communicating with the latter even if another existing host computer could have the needed resources for processing the transactions. In this case, the overload of one host computer affects the overall availability of the network such as appearing to the end user.

The prior art does not provide a communication controller allowing the connection of virtual circuits (VC) according to the X25 recommendations to SNA sessions which has an increased availability and improved re-routing possibilities.

BRIEF SUMMARY OF THE INVENTION

The invention solves the problem raised by the prior art by providing a communication controller which includes means for establishing predetermined SNA sessions between the application programs running in at least one host server and the communication controller, and means for linking at least one virtual circuit on a predetermined SNA session. The controller further includes means for storing a set of alternate session tables defining, for each of said established predetermined SNA sessions, a prioritized list of alternate backup sessions, means for detecting the occurrence of one incident on one SNA session, and means for switching the virtual circuits linked to said session being subject of an incident to one backup session defined in the corresponding alternate session table. The advantage of this result in that the alternate sessions being pre-established, the virtual circuits can be connected immediately to one alternate session without requiring further delay. A quick end-user reconnection is then allowed.

In a preferred embodiment, the controller includes means for detecting the occurrence of a failure on one session and also the occurrence of a message transmitted from one application program loaded into one host server indicating that said application program is overloaded and would refuse any additional VC connection to this application program.

Preferably, the controller includes means for concentrating multiple virtual circuits on one single SNA session. A substantial decrease of the number of SNA sessions is therefore provided, thus saving a great amount of storage within the remote controller. The user can adapt the network behavior to his requirements by defining a large number of pre-established alternate backup sessions for any session.

DETAILED DESCRIPTION OF THE PREFERRED EMBODIMENT OF THE INVENTION

At the beginning of operation of the telecommunication network including the controller according to the present invention, the communication controllers are loaded with the network control programs and the remote controllers 107 and 108 are also loaded with the tables described hereinafter with respect to FIGS. 4A–4D in accordance with the customer requirements.

Figure 1:
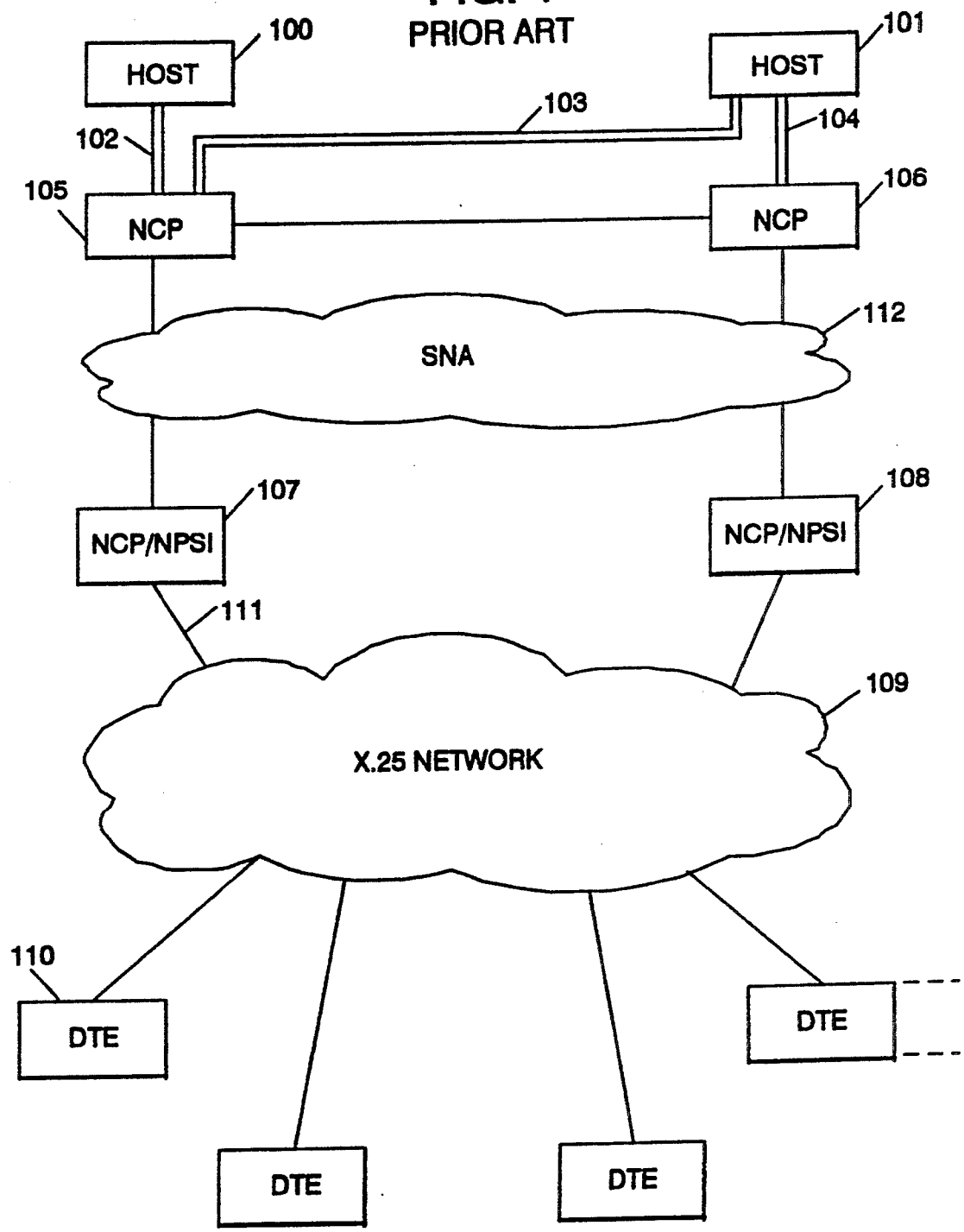
FIG. 1 illustrates a telecommunication network including a SNA network and X25 network.
Figure 2:
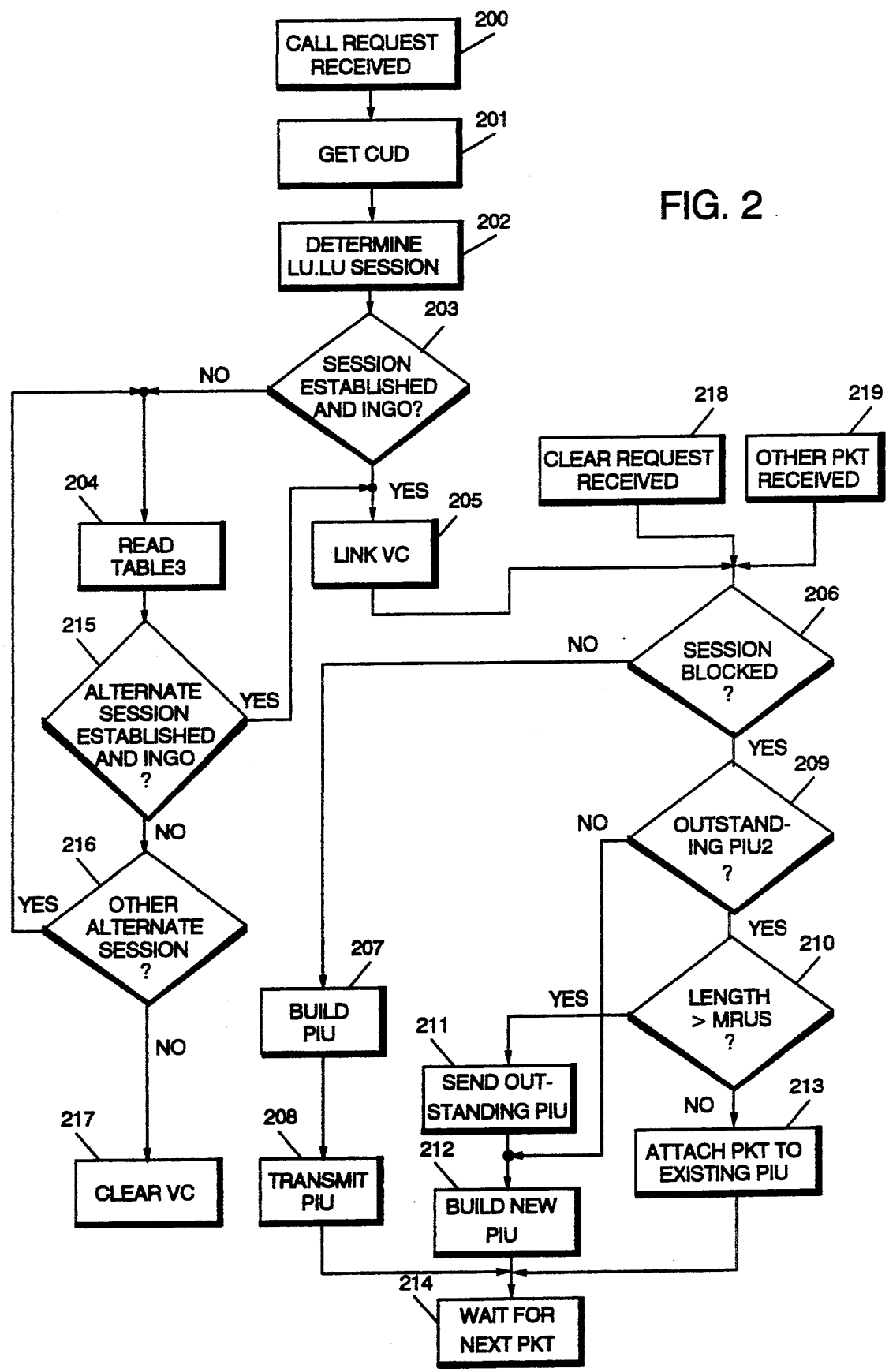
FIG. 2 shows a flow chart illustrating the transfer of data through the X25 and SNA network in accordance with the present invention.

FIG. 2 shows a flow chart illustrating the transfer of data through the X25 and SNA network in accordance with the present invention. The communication of one DTE 110 with one host server, for instance host server 100, is initiated by a log-on request issued by the end-user from the Data Terminating Equipment (DTE). The log-on request results in the transmission of a CALL REQUEST message through the X25 network 109 to a dedicated remote communication controller, for instance controller 107, step 200. The transmitted CALL REQUEST message particularly contains two distinctive fields: a first field indicating the calling number of one of the lines which is associated with the communication controller 107 through which the CALL REQUEST message will transit; and a second user field—hereinafter referred to as Call User Data (CUD)—which identifies the Communication and Transmission Program loaded in host 100 or 101 or more generally the application program to which the user wishes to be connected. It should be noticed that the host server 100, 101 or the others may be loaded with numerous different Communication and Transmission Programs, for instance credit card communication programs or airlines reservation communication programs characterized by short transactions. The remote communication controller 107 allowing the attachment to the SNA and X25 network uses an address table 1 indicating for every CUD one associated SNA session (LU). This first table defines the mapping between the CUD field in the incoming CALL REQUEST and the session (LU) which will be used for the virtual circuit allowing the communication with the required Communication and Transmission Control Program in host server 100 or 101. This first table indicates the routing of the data between the DTE and the application programs in the host servers can be defined by the customer as will be detailed hereinafter. Therefore, every X25 remote communication controller 107 or 108 has at least one pre-established SNA session per application program running in the host servers. When the network is initialized, that first address table, and also the tables described below, are loaded in the communication controllers and a network operator activates the SNA sessions in accordance with the well-known communication rules and procedures. The activation of the SNA network is particularly achieved by the transmission of specific SNA commands, for instance the BIND command which is generated by the application program running in the host server 100. That BIND command is transmitted throughout the SNA network 112 to the remote communication controller 107 or 108 in order to indicate to the latter that the considered SNA session has been established and can be used for the transmission of data. The set of SNA commands and the description of SNA sessions can be particularly found in document "Systems Network Architecture", IBM Technical Overview GC-3073-1 page 11. At the reception of the CALL REQUEST message issued from DTE 110, which message is then considered as an INCOMING CALL by the remote communication controller in accordance with the CCITT Recommendations for X25, the latter message is processed by the remote communication controller (107 in our example). The processor located in controller 107 associates this incoming call, which is received over an X25 Virtual Circuit (VC) characterized by a Logical Channel Group Number (LCGN) and a Logical Channel Number (LCN) as described in CCITT Recommendations for X25, with a VC table 4 corresponding to that VC. As will appear below, the LCGN/LCN identifier is associated with a MCH identifier characterizing the line number and both constitute an identifier which is stored into a first field of every VC table 4. Then the processor reads the contents of the second field step 201 in order to determine in the address table 1 which SNA session will be used for the considered CUD, step 202. When the SNA session has been identified, the processor checks its status step 203 in a second SNA session table 2 in order to determine whether the latter is established and also in a GO state. The SNA session can be put in a NOGO state by the host server 100 when its physical resources are overloaded. Indeed, when the host server 100 or 101 decides that an application program becomes unable to support any additional incoming calls, (for instance in the case of an overload of the buffer storage in host server 100 or 101, or in case of an overload of the Central Processing Unit), host server 100 or 101 transmits to the remote communication controller 107 and 108 a NOGO command on one or more sessions indicating to the latter that no additional VC will be accepted. On the reception of such a NOGO command, or conversely the reverse GO command, the remote controller updates the contents of the SESSION table 2 relative to the considered session. If no NOGO command has been received, the state by default is set to INGO.

With respect to FIG. 2 again, if the session is found by the processor running in controller 107 as being established and in a INGO state, the process proceeds to step 205 where the Virtual Circuit (VC) is linked to the considered LU-LU session, that is to say a VC table 4 is updated which permits the routing of any message coming from that Virtual Circuit to the considered LU-LU session. This is achieved by the storing of the starting address of the session table 2 corresponding to the considered LU-LU session in the second field of table 4.

In addition, the identifier LCGN/LCN/MCH loaded in first field of the VC table 4 is transmitted with the packets corresponding to the considered VC, to the host server which can analyze it. Conversely, the host server inserts the identifier LCGN/LCN/MCH into the packets which are relating to the considered VC so that controller 107 can locate the appropriate VC table 4 corresponding to this virtual circuit and forward the packet over it. Therefore, there is provided the concentration of numerous Virtual Circuits on one single LU-LU session since packets of data coming from different Virtual Circuits will be transmitted on the same LU-LU session. The problem of concentrating different virtual circuits on a single LU-LU session is particularly addressed in the document "Fast Transaction Processing Interface" in IBM Technical Disclosure Bulletin, Vol. 33, N[9, Feb. 1991, pages 263-265. Since many transactions such as credit card or airlines companies reservations applications are short in terms of exchanged packets length, the concentration process entails a decrease of the Path Information Units (PIU) exchanged between the host and the remote communication controller 107 and thus improves the performance of the processors in the controllers and also in the host servers. Moreover, the traffic on one single LU-LU session is increased while the total number of sessions is substantially reduced, thus making the establishment of the latter easier and reducing the total time needed to set up tile sessions.

In accordance with the present invention, the remote communication controller 107 involves an alternate session table 3 which defines the alternate backup sessions which can be used in case of a failure occurring on one given LU-LU session. The low number of LU-LU sessions which are involved in the SNA network allows for each customer to easily define and manage the alternate backup session table 3 in accordance with Iris requirements. The low number of LU-LU sessions also allows the customer to define, for each given LU-LU session, a high number of alternate backup sessions thus increasing the possibility of rerouting of the transmitted PIU and thus improving the overall availability of the telecommunication network. A large number of alternate backup sessions is provided without requiring a large quantity of storage since the overall number of sessions is low. Step 206, a test is performed in order to determine whether the considered LU-LU session should perform blocking of several packets per PIU. To achieve this, the processor running within remote controller 107 measures the traffic existing on the considered session by computing an average of the ratio of the number of transmitted packets by unit of time. Then, the processor compares the result of this computation with a predetermined value which is defined by the customer and loaded in the storage associated with the remote controller 107. If the result of the computation appears to be less than the latter predetermined threshold value, the session is considered as being in a non-blocked state and the process proceeds to step 207. Step 207, the processor running in controller 107 builds a Path Information Unit (PIU) which consists of the basic SNA element which is transmitted on one LU-LU session, as explained in page 101 of the document "IBM Systems Network Architecture" referenced above. To achieve this, the processor adds an appropriate header to the packet to be transmitted on the LU-LU session and transmits the PIU on the considered session through the corresponding communication elements, i.e. the SNA network 112, the local communication controller 105, the channel 102 to the host server 100, step 208. On the contrary, if the result of the computation of step 206 appears to be greater than or equal to the predetermined threshold value, the session is considered as being in a blocked state and the process proceeds to step 209. Step 209 a test is performed in order to determine whether the building of one PIU is currently in progress, in which case the processor goes to step 210. Step 210, the processor calculates the length of the PIU if the new packet was added and compares the latter value with a predetermined "Maximum Request Unit Size" (MRUS) stored into the memory associated with the remote controller 107. The "Maximum Request Unit Size" is a parameter which can be programmed by the customer for adapting the network to his requirements and which is transmitted into the BIND command characteristics of a given SNA session. If the calculated length appears to be superior to the "Maximum Request Unit Size", the processor directly transmits the outstanding PIU which is still waiting step 211, and also starts the building of a new PIU in step 212 by attaching a new header to the newly received packet. In the case when the calculated length is less than or equal to the specified "Maximum Request Unit Size", the processor attaches the new packet to the existing PIU which is waiting, step 213. When the current packet has been processed, the processor waits for a new packet coming from the X25 network, step 214. In the preferred embodiment of the invention, a timer is included in the remote controller 107 and operates in the block session state. The timer continuously measures the time during which a determined PIU is blocked within the controller and compares the value to a predetermined threshold value which is specified by the customer and loaded into the memory of the controller. As soon as the timer reaches the value of the threshold, the outstanding PIU being in progress is transmitted without any further delay on the SNA session whatever its length is. Therefore, if the traffic is low in terms of number of packets, the timer ensures that one packet will not be blocked too often. In the preferred embodiment of the invention, the threshold value is a multiple of 100 milliseconds. The PIU including particularly the CALL REQUEST (or incoming call) issued by DTE 110 is received by the host server 100. The application programs running inside host server 100 process the different packets and particularly the incoming call coming from the DTE which has issued a log-on request. Then a series of internal tests is performed inside the host server in order to particularly determine whether the end-user who has requested the transaction is authorized to communicate with the application. Then the host server 100 transmits an acknowledging message indicating that the communication is either accepted or refused, the latter message being transmitted to the DTE via the SNA and X25 network. As mentioned above, the message includes the identifier LCGN/LCN/MCH which will allow controller 107 to locate the appropriate VC table 4 corresponding to the considered VC. Assuming that the connection and the communication is authorized, the DTE transmits and receives data with the host server 100, step 219 until a CLEAR REQUEST command is issued, step 218. In the case when the test performed in step 203 has revealed that the session has not been established or that the session is in a NOGO state, the processor proceeds to step 204 where it looks into an alternate session table 3 comprising a prioritized list of alternate sessions which has been specified by the customer and loaded into the memory in controller 107. Then step 215, the processor checks whether the first element appearing in the list of alternate sessions for the considered LU-LU session is established and in a GO state, in which case the process goes to step 205 where the virtual circuit is linked to that LU-LU session by the update of the second field of the considered VC table 4. Conversely, the processor checks whether an additional item of the list of table 3 can still be tried step 216. If another item exists in the list, the processor goes back to step 204 in order to read that next item and to see whether the corresponding LU-LU session is established and in GO state. If no more items actually exists in the table 3, the process goes to step 217 where the remote communication controller clears the virtual circuit by means of a CLEAR REQUEST in order to indicate to the DTE 110 that the CALL REQUEST has failed. It should be noticed that the use of the alternate session table 3 provides the customer with the possibility of easily managing the rerouting of the session in case of failures without requiring a substantial amount of memory storage and processing power since the number of sessions has been limited to one or few sessions per host, or more accurately per application program, instead of one session per virtual circuit. In the preferred embodiment of the invention, the alternate session table allows designation of a set of 27 alternate session tables for one given LU-LU session which allows a substantial increase in the interconnectability of the different elements of the network and consequently an increase in the overall availability of the network in case of trouble.

Figure 3:
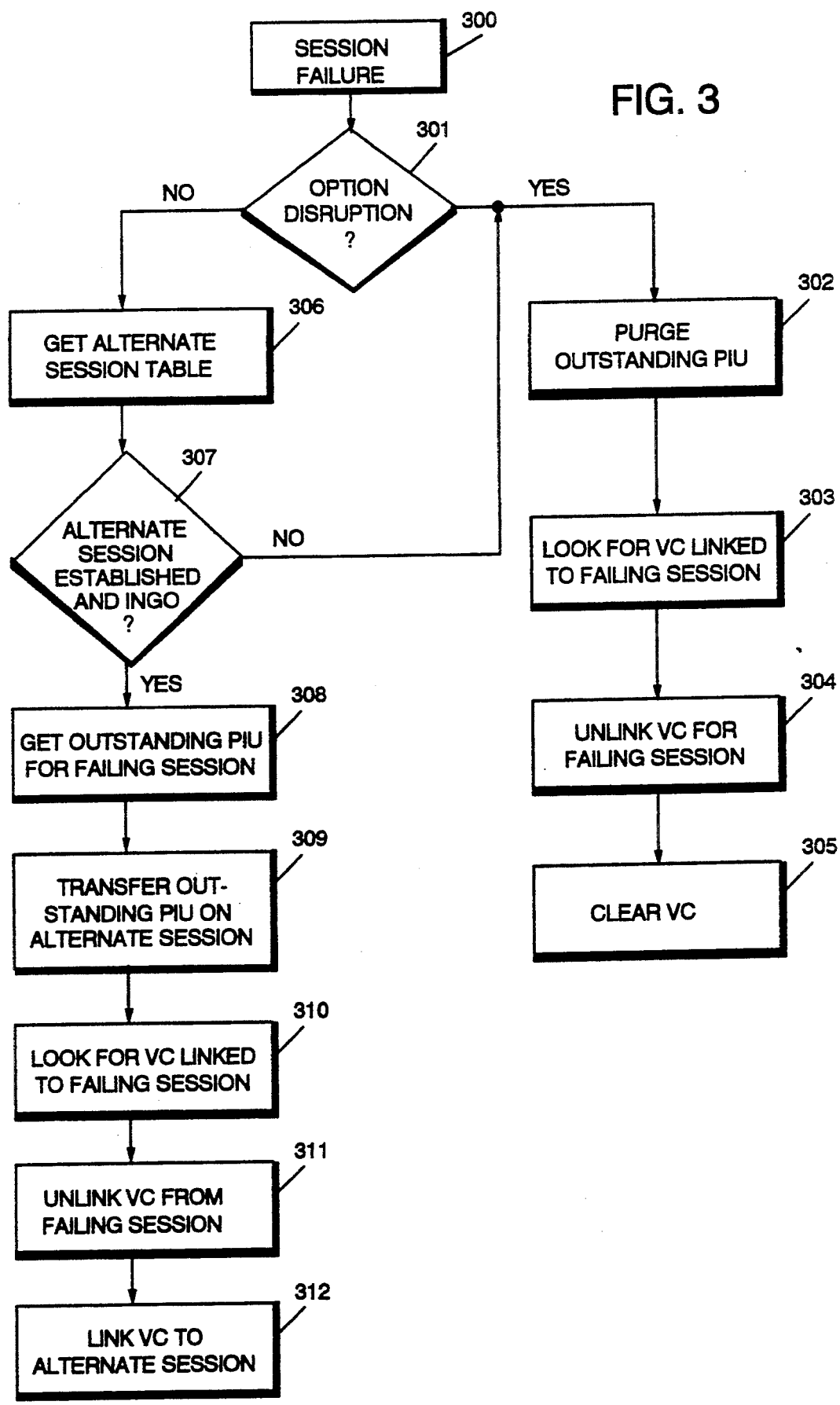
FIG. 3 is a flow chart illustrating the operations which are involved in the controller according to the present invention when an incident on one session occurs.

FIG. 3 illustrates the operating of the method in accordance with the present invention when a failure occurs in the network. When a session failure occurs in the networks, the remote controller 107 for instance receives an UNBIND command from one of the elements in the network indicating that one session has been the subject of an outage, step 300. The communication of the SNA messages which occurs in such a case is particularly described in the "IBM Systems Network Architecture" document above. The session which is the subject of an UNBIND command is then considered as being no longer established. Then step 301, the processor checks the value of a DISRUPTION flag to determine whether the session failure should entail the direct switching to an alternate backup session determined in alternate session table 3 without requiring a manual intervention of the end-user, or conversely if the session failure should result in a log-off of all the DTE 110 asking the end-user to re-request another connection. The setting of the DISRUPTION flag to one determined value provides the end-user with the possibility of choosing whether an incident should or not be reported to him and ask for his manual intervention. If the user has decided to be informed of any incident, then the process goes to step 302 where the processor purges the outstanding PIU by releasing the portion of the memory which was affected for the building of the outstanding PIU. Then step 303, the processor checks for every virtual circuit (VC) to see whether the latter is not associated with the LU-LU session which has just been the subject of a failure. For every VC which was affected by the failing session, the processor updates the second field of VC table 4 in order to indicate that that VC is no longer associated with the failed LU-LU session, step 304 and the virtual circuit is cleared by means of a CLEAR REQUEST step 305.

In the case where the DISRUPTIVE flag is at a state corresponding to the non-disruption option, that is to say an option where the remote controller 107 is requested to automatically switch the virtual circuit to an alternate backup session, the test of step 301 results in the processor going to step 306. Step 306, the processor addresses the alternate session table 3 as in steps 204, 215 and 216 of FIG. 2 in order to find in the list of alternate sessions one alternate session which is simultaneously established and in INGO state. Then step 307, a test is performed in order to determine whether all the alternate sessions specified in alternate session table 3 have been checked without any success. If no alternate session has been established and found in a INGO state, the processor goes to step 302 above which will inevitably result in the clearance of the virtual circuit. Such an occurrence should be rare since the low number of sessions involved in the operating of the network allows the customer to define a great number of alternate sessions for one session. As mentioned above, the number of alternate sessions has been fixed at 27 in the preferred embodiment of the invention which allows a high number of rerouting possibilities. In the most probable case where one alternate session among the list of table 3 is found to be established and also INGO state, the processor goes to step 308 where it retrieves the outstanding PIU in progress and then transfers it on the latter alternate session by updating the PIU field in table 2 of FIG. 4, step 309. Then step 310, the processor checks for every virtual circuit that the latter is not associated with the failing session. If the considered virtual circuit is associated with the failing session, the processor unlinks the latter to the failing session step 311 and also links the latter to the alternate session, step 312. This is achieved by the update of the second field of VC table 4.

Figure 4A:
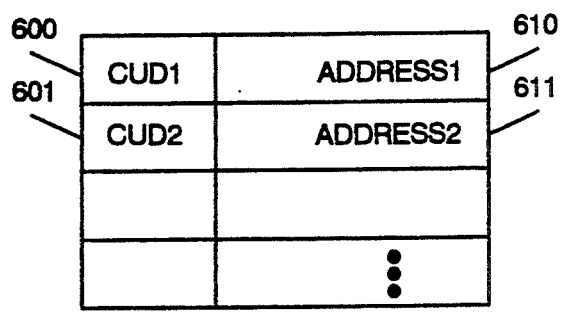
FIG. 4A illustrates the structure of the address table which identifies the SNA session associated with each application program.
Figure 4B:
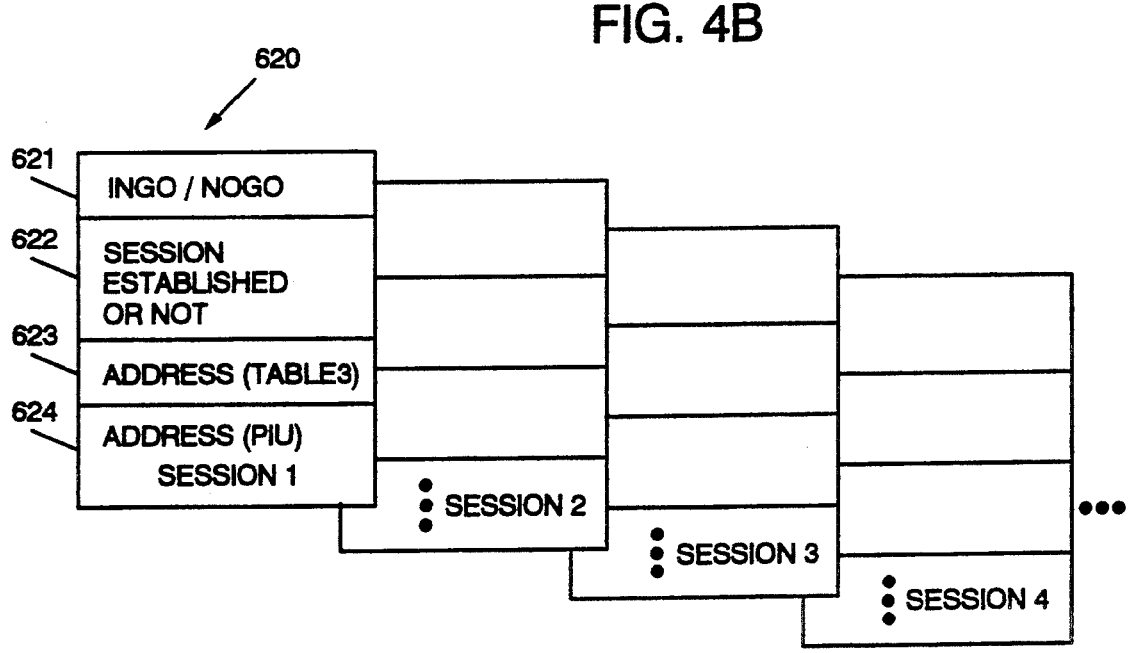
FIG. 4B illustrates the structure of the session table which identifies the status of an SNA session and the address of a backup session.

FIGS. 4a, 4b, 4c and 4d illustrate the preferred embodiment of the tables used by the controller 107 in accordance with the present invention and allowing the management of the rerouting process. FIG. 4a shows the address table giving for every CUD extracted from the CALL REQUEST received by the remote controller the address of the associated session table 2. In the preferred embodiment of the invention, the CUD is one byte which is processed by the processor in order to compute a value corresponding to the address 610 or 611 of a location in the controller memory storing the address of one session table such as shown in FIG. 4b. The concentration process of different virtual circuits on a single LU-LU session, for instance the session 1, can be easily achieved by storing the same address of the session1 table in different locations 610, 611 . . . The structure of one session table 620 is illustrated in FIG. 4b. Every session table, for instance session1 table, is located in a portion of the memory of the controller, which portion starts at an address given by the second field 610, 611 of address table 1. Every session table includes a first field 621 indicating whether the corresponding session (session 1 in our example) is in an INGO or NOGO state, that is to say whether the host server has informed the remote controller that it would not accept any additional session, a second field 622 indicating whether the considered session is established or not, a third field indicating the starting address of the alternate session table corresponding to the session1 and a fourth field 624 indicating the address in the controller memory of the outstanding PIU which is affected by this session.

Figure 4C:
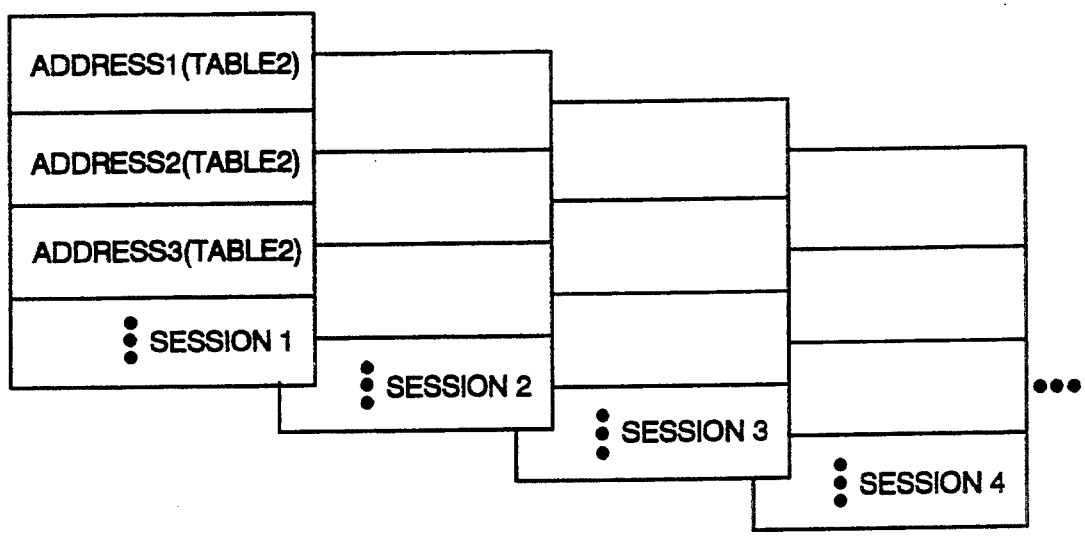
FIG. 4C illustrates the structure of the backup session table.

The structure of one alternate session table 3 is given in FIG. 4c. In the preferred embodiment of the invention, every alternate session table includes a set of n fields (e.g. a set of 27 fields), each field indicating the starting address of one session table defined by the customer as being a possible backup session. Therefore, the switching process of one session to an alternate session table is easily provided. When the remote controller receives a CALL REQUEST as in step 200, the latter extracts the CUD and gets directly from its memory the address in field 610 or 611 . . . of one LU-LU session. The test performed in step 203 is achieved by reading the fields 621 and 622 of the considered session to determine whether the virtual circuit can be linked to that LU-LU session. If the test performed in step 203 falls, the processor reads the third field 623 of the session table in order to read the contents of the alternate session table 3 corresponding to the considered LU-LU session. The processor reads then the first field of the alternate session table 3 in order to find the address of the alternate session table 2, which alternate session is analyzed in order to determine whether the latter is established and in GO state in accordance with step 215. This is again achieved by reading the first and second field 621 and 622 of the alternate session table. Assuming that the first alternate session of the table 3 is not established or is in a NOGO state, the processor reads the second element in the list of the alternate session table 3 to find the address of the second alternate session to check and so on. A simple mechanism is therefore provided which allows the definition and the management of a large number of alternate backup sessions for one given session. Since the number of LU-LU sessions has been significantly reduced, the definition of the alternate backup sessions can be made and organized by the customer thus allowing him to adapt the routing process in accordance with his requirements.

Figure 4D:
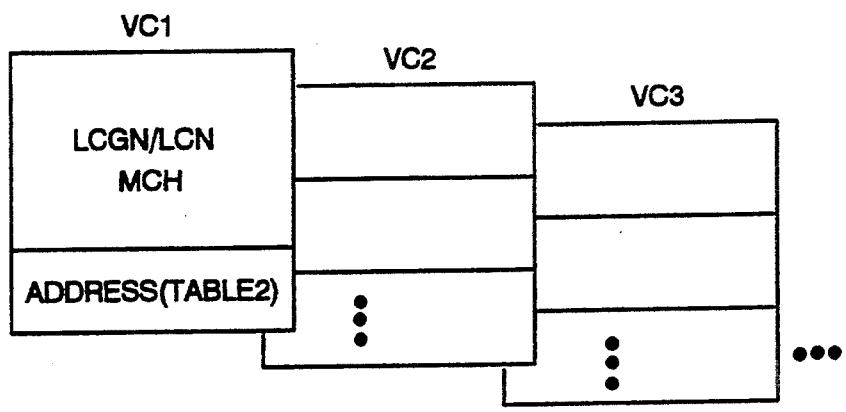
FIG. 4D illustrates the structure of the virtual circuit table which correlates virtual circuits with each SNA session.

The structure of VC table 4 is shown in FIG. 4d. VC table 4 has, for every Virtual Circuit, a first field in which is stored the identifier LCGN/LCN/MCH. The LCGN/LCN/particularly identifies the VC connection, while the MCH identifies the line number. VC table 4 has a second field giving the starting address of the session table 2 corresponding to the LU-LU session to which is linked the Virtual Circuit.

We claim:

1. A communication controller in a telecommunication network including a first SNA subnetwork and a second X25 packet switched network for allowing communication between application programs running in at least one host computer and numerous Data Terminating equipments (DTE) attached to said X25 packet switched network and communicating by means of virtual circuits (VC), said communication controller comprising:
    means for establishing predetermined SNA sessions between said communication controller and said application programs;
    means for linking a plurality of virtual circuits on one of said predetermined SNA sessions;
    means for storing a set of alternate session tables defining for each of said predetermined SNA sessions a prioritized list of alternate backup sessions;
    means for detecting the occurrence of a failure on one SNA sessions;
    means for switching the virtual circuits linked to said session being subject to the failure to one backup session defined in the corresponding alternate session table.

2. The communication controller according to claim 1 including means for detecting a message transmitted from one application program loaded in one of said host computers, said message indicting that said application program is overloaded and that it cannot accept connection to any additional virtual circuit.

3. The communication controller according to claim 1 including means for blocking a plurality of packets received from the X25 network and which are to be transmitted to one application program and means for concentrating said plurality of packets in a single Path Information Unit (PIU).

4. The communication controller according to claim 3 including means for limiting the length of said PIU to a predetermined value.

5. The communication controller according to claim 4 including means for limiting the blocking time of one given packet to a second predetermined value.

6. The communication controller according to claim 1 further including means for storing:
    a first address table indicating for every application program running in said at least one host computer the SNA session which is associated with the application program,
    a set of second session tables indicating for every SNA session the status of the session and the address of an associated alternate session table.

7. The communication controller according to claim 1 wherein each alternate session table associated with the corresponding session indicates a prioritized list of alternate sessions which are to be used when the failure on the corresponding session occurs.

* * * * *